United States Patent [19]

Sterrett et al.

[11] 4,042,846
[45] Aug. 16, 1977

[54] UNITARY SUPPORTING STRUCTURE FOR SUPERCONDUCTING FIELD ASSEMBLY

[75] Inventors: Charles C. Sterrett, Pittsburgh; Cecil J. Mole, Monroeville, both of Pa.

[73] Assignee: Westinghouse Electric Corporation, Pittsburgh, Pa.

[21] Appl. No.: 595,981

[22] Filed: July 14, 1975

[51] Int. Cl.$^2$ .......................................... H02K 9/00
[52] U.S. Cl. ................................................. 310/52
[58] Field of Search ............... 310/10, 40, 52, 165, 310/54, 64, 194, 201, 42, 61

[56] References Cited

U.S. PATENT DOCUMENTS

| | | | |
|---|---|---|---|
| 3,644,766 | 2/1972 | Hughes | 310/165 |
| 3,648,082 | 3/1972 | MacNab | 310/10 |
| 3,679,920 | 7/1972 | MacNab | 310/52 |
| 3,742,265 | 6/1973 | Smith | 310/52 |
| 3,764,835 | 10/1973 | Luck | 310/52 |
| 3,772,543 | 11/1973 | Woodson | 310/52 |
| 3,904,901 | 9/1975 | Renard | 310/52 |

Primary Examiner—R. Skudy
Attorney, Agent, or Firm—G. H. Telfer

[57] ABSTRACT

A unitary supporting structure for enclosing the superconducting field assembly of a dynamoelectric machine has a drive shaft portion for transmitting torque from a prime mover to the field assembly and a tubular portion integrally formed with the drive shaft portion. The tubular portion has a circumferentially extending outer wall which in combination with the drive shaft portion defines a chamber having a closed end with which the drive shaft portion is integrally formed and an opened end for receiving the field assembly. The field assembly is secured to the unitary supporting structure within the chamber in a cantilever mounting arrangement. The chamber is closed by means of an end plate to which a support shaft is affixed. The support shaft cooperates with the drive shaft portion to support the unitary structure for rotational movement within an annular stator member.

5 Claims, 1 Drawing Figure

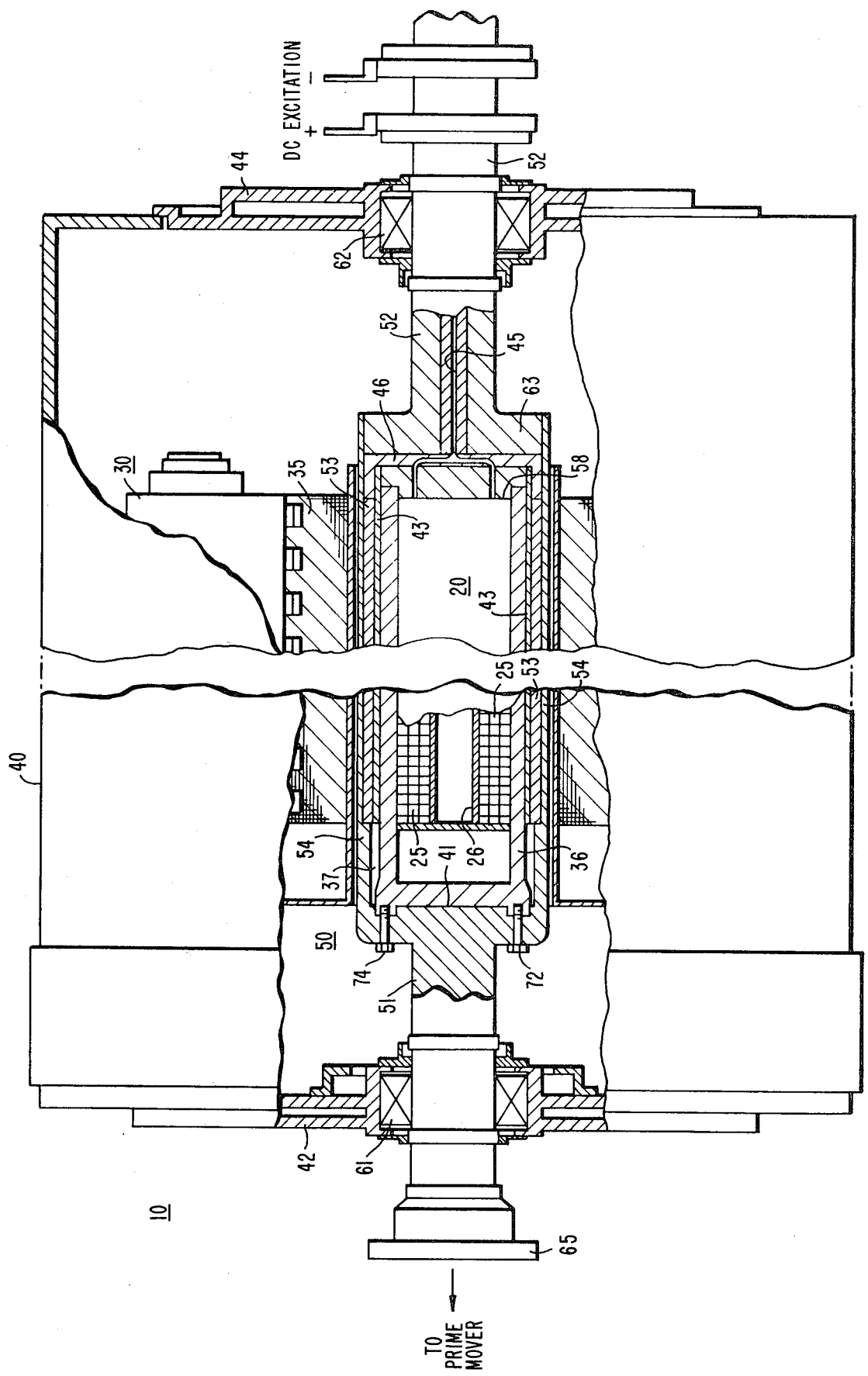

UNITARY SUPPORTING STRUCTURE FOR SUPERCONDUCTING FIELD ASSEMBLY

BACKGROUND OF THE INVENTION

1. Field of the Invention

This invention relates primarily to superconducting dynamoelectric machinery, and more specifically, this invention relates to a supporting structure for a rotating superconductive field winding.

2. Description of the Prior Art

It is known that when certain materials, referred to as superconductors, are cooled to near absolute zero they exhibit a complete loss of electrical resistance. Practical utilization of the zero resistance character of superconductive materials at cryogenic temperatures has recently been applied to dynamoelectric machinery. The development of the intrinsicly stable multi-filamentary superconductor has made it possible to build stable superconducting windings with relatively high transport current densities in large direct current fields.

The use of the superconductive direct current field winding considerably increases the field magnetomotive force generated by the windings and provides greatly increased flux densities in the active air gap of the machine. This increase in flux density obtains considerably increased power density and consequential reductions in the weight and volume of the machine. Thus higher ratings for turbine generators can be obtained without prohibitive increases in frame size.

The rotor structure of conventional superconducting generators is tubular as contrasted to the solid rotor structure of normally conducting rotors. The tubular construction provides a reduction in weight as well as providing shielding, vacuum containment, and torque coupling. It has been customary to join the drive shaft to the tubular structure by means of welding. A welded construction for the superconducting rotor assembly is undesirable. The heat of welding changes the metallurgical properties of the structure which can lead to high residual stresses, and to subsequent service failure. Desirable forging properties are achieved by the initial forging and heat treating procedures and it is not possible to repeat these in the locally affected areas where welding has been performed. Welding also results in uneven temperature gradients so that subsequent machining operations can cause distortions. Thus it would be desirable to provide a unitary supporting structure for the superconducting field winding assembly of a dynamoelectric machine in which structural welding in the rotor structural members is avoided.

SUMMARY OF THE INVENTION

The present invention provides a unitary structure for enclosing and supporting a superconducting field assembly of a dynamoelectric machine. The unitary structure has a drive shaft portion for transmitting torque from a prime mover to the field assembly and a tubular portion integrally formed with the drive shaft portion for enclosing the field assembly. The tubular portion has a circumferentially extending wall which in combination with the drive shaft portion defines a cylindrical supporting chamber having a closed end with which the drive shaft portion is integrally formed and an opened end for receiving the field assembly. The drive shaft portion and the tubular portion are continuously forged from a non-magnetic metal to form a single unitary structure.

The field assembly is completely enclosed within the chamber and is secured to the closed end of the tubular portion in a cantilever mounting arrangement. On the excitation end, the unitary rotor forging structure is fitted by shrinking and keying to a supporting shaft. In accordance with the invention, the unitary tubular structure provides a continuous forging for the drive shaft end and for the body of the supporting cylinder where bending and torsional stresses are high under steady-state and transient operating conditions. The shrink fit and key joint on the excitation end is subjected to lower stresses since the torsional stresses that may occur are low because of the low inertial mass beyond the shrink fit zone.

Means are provided for thermally insulating the superconductive field winding assembly from the unitary supporting structure. The support shaft is adapted to permit passage of a cryogenic fluid to the field winding assembly.

The foregoing and other objects, advantages, and features of this invention will hereinafter appear, and for purposes of illustration, but not of limitation, an exemplary embodiment of the subject invention is shown in the appended drawing.

BRIEF DESCRIPTION OF THE DRAWING

The sole FIGURE of the drawing is an elevational view of a dynamoelectric machine, partly in section, in which an embodiment of the invention is incorporated.

DESCRIPTION OF THE PREFERRED EMBODIMENT

Referring now to the drawing, the Figure illustrates a synchronous generator 10 having a superconductive rotor field winding assembly which is constructed and supported according to the teachings of the present invention in a manner to be hereinafter described.

The generator 10 comprises a rotor assembly 20 and a stator assembly 30 which are enclosed in a housing 40. The housing 40 is generally cylindrical in shape and is closed by end plates 42 and 44. A drive shaft 51 and a supporting shaft 52 are mounted in the housing by bearings 61 and 62, respectively. The bearings 61 and 62 are conventional and are positioned at each end of the housing 40 to support the shafts 51 and 52 for rotational movement by a prime mover (not shown). A drive coupling 65 is used to connect the rotor assembly 20 to the prime mover.

The rotor field assembly 20 comprises a superconductive DC field winding 25 which is wound about a non-ferromagnetic core 26. The core 26 is made of a material which has high mechanical strength and good ductility at cryogenic temperatures, such as austenitic stainless steel, although other non-ferromagnetic materials may be used to good advantage. By "non-ferromagnetic material" it is meant a substance whose relative permeability is approximately 1. Also shown is the stator 30 which supports a nonsuperconducting winding 35. The stator winding 35 is adapted for multi-phase AC output, and the rotor field winding 25 is adapted for connection to a DC source (not shown) for the excitation of the generator.

The winding 25 is comprised of composite conductors made of a superconductive material such as niobium titanium (Nb-Ti) alloy. Each composite conductor consists of a plurality of fine filaments, each filament being approximately 40 microns or less in diameter. The filaments are embedded in a copper sheath are twisted about the composite axis. The entire composite is covered by a layer of insulation.

A dewar vessel 36 encloses the field assembly 20 and takes the shape of a cylindrical annulus with a vacuum chamber 37 separating the dewar vessel from ambient conditions. In the vacuum chamber 37 there is located a radiation shield 43 which aids in preventing thermal conduction from the exterior of the dewar vessel 36 to the interior thereof. As a result of the insulation that is created by the vacuum chamber 37 and the radiation shield 43, the interior of the dewar vessel 35 is thermally isolated from the unitary supporting structure 50 and ambient conditions.

The interior of the dewar vessel 36 is maintained at a temperature near to absolute zero by an appropriate cryogenic fluid, such as nitrogen or helium. Due to the lower boiling temperature of helium (approximately 4° Kelvin), it is generally preferred for the cryogenic fluid, although other cryogenic fluids may have equal or better utility in certain situations. The cryogenic fluid is introduced to the interior of the dewar vessel 36 through a conduit 45 which extends through an end plate 44. The conduit 45 is appropriately insulated to minimize heat transfer.

The superconducting field winding 25 and core 26 are positioned concentrically within the dewar vessel 36. As a further protective measure an eddy current damper shield 53 made of electrically conductive material is located in a recessed annulus of the unitary supporting structure 50. In some instances the damper shield 53 could be constructed of an electrically conductive material, such as copper. Other conductive materials, such as aluminum, may be used to good advantage. The eddy current damper shield aids in preventing AC fields from penetrating into the superconductive field winding.

The supporting structure 50 for the superconducting field assembly 20 comprises generally the drive shaft portion 51 which couples torque from a prime mover to the field assembly 20 and a tubular portion 54 which is integrally formed with the drive shaft portion. The tubular portion 54 is a generally circumferentially extending annulus which in combination with the drive shaft portion defines the chamber 37 having a closed end 41 with which the drive shaft portion 51 is integrally formed and an open end 58 for receiving the field assembly 20. The dewar and field winding assembly are secured to the closed end 41 of the tubular portion 54 in a cantilever mounting arrangement by means of bolts 72 and 74.

The unitary supporting structure 50 maintains the vacuum environment for the superconducting field assembly 20. Because of the large inertial mass of the rotor structure, the drive shaft portion 51 and the tubular member 54 are integrally joined and are formed from a single steel forging of a non-magnetic metal such as Inconel X-750 steel. The continuously forged unitary supporting structure 50 provides maximum strength at the drive shaft end where bending and torsional stresses are highest under steady-state and transient conditions.

Opposite the drive shaft end on the excitation end of the tubular member 54, an end plate 63 is provided to close the chamber 56. The supporting shaft 52 is preferably integrally formed with the end plate 63 in the same manner that the drive shaft portion 51 is formed with the tubular portion 54. However, the end plate 63 is secured to the tubular member 54 by means of shrinking and keying. The shrink fit and key joint are sufficient since the excitation end of the rotor assembly is subjected to lower stresses as compared with the drive shaft end because of the lower inertial mass beyond the shrink fit zone.

It will be apparent that an improved supporting structure has been provided for a superconductive winding assembly of a dynamoelectric machine. While a particular embodiment of the invention has been shown and described for the purpose of illustration, other arrangements and embodiments may be practiced by those skilled in the art without departing from the scope and spirit of the invention. It is not desired, therefore, that the invention be limited to the specific arrangement described herein.

What we claim is:

1. In a dynamoelectric machine having an annular stator member and a rotor having a field assembly including a core member with a superconducting winding disposed thereon, an improved arrangement for supporting said field assembly comprising:

a unitary structure for enclosing said field assembly, said unitary structure having a drive shaft portion for transmitting torque from a prime mover to said field assembly and a tubular portion integrally formed with said drive shaft portion, said tubular portion having a circumferentially extending annulus which in combination with said drive shaft portion defines a chamber having a closed end with which said drive shaft portion is integrally formed and an opened end for receiving said field assembly;

means for securing said field assembly to said unitary supporting structure within said chamber, said field assembly being enclosed within said chamber and being secured to the closed end of said tubular portion in a cantilever mounting arrangement therewith;

an end plate secured to the opened end of said tubular portion to seal said chamber;

a support shaft secured to said end plate, said support shaft cooperating with said drive shaft portion to support said unitary structure for rotational movement within said annular stator member;

a dewar vessel in the form of a generally concentric annulus having thermally insulating portions, said dewar vessel being concentrically disposed within said chamber, said field assembly being enclosed within said dewar vessel which thermally isolates said superconducting winding from said unitary supporting structure;

an eddy current damper shield formed of conducting material concentrically disposed intermediate of said circumferentially extending tubular portion and said dewar vessel; and a radiation shield concentrically disposed intermediate of said eddy current damper shield and said dewar vessel.

2. The combination as defined in claim 1, said unitary supporting structure being formed of a unitary forging of a non-magnetic metal.

3. The combination as defined in claim 1, wherein:
 said drive shaft and said support shaft are concentric with said core member;
 said core member is concentric with said tubular portion of said unitary structure; and
 said tubular portion of said unitary structure is concentric with said annular stator member and is disposed internally thereof.

4. The combination as defined in claim 1, wherein said support shaft and said end plate are adapted to permit passage of a cryogenic fluid from a cryogenic source to said dewar vessel and said field assembly.

5. The combination as defined in claim 1, wherein said end plate and support shaft are integrally formed into a unitary structure.

* * * * *